United States Patent
Nakagawa et al.

(10) Patent No.: US 8,324,873 B2
(45) Date of Patent: Dec. 4, 2012

(54) POWER SUPPLY APPARATUS AND POWER SUPPLY METHOD

(75) Inventors: Shinichi Nakagawa, Kasugai (JP); Masahiro Natsume, Kasugai (JP); Katsuyuki Yasukouchi, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 314 days.

(21) Appl. No.: 12/636,764

(22) Filed: Dec. 13, 2009

(65) Prior Publication Data

US 2010/0090673 A1 Apr. 15, 2010

Related U.S. Application Data

(63) Continuation-in-part of application No. 12/354,413, filed on Jan. 15, 2009, now abandoned.

(30) Foreign Application Priority Data

Jan. 16, 2008 (JP) ................................. 2008-007414
Dec. 23, 2008 (JP) ................................. 2008-326685

(51) Int. Cl.
*G05F 1/613* (2006.01)
(52) U.S. Cl. ...................................... 323/224; 323/283
(58) Field of Classification Search .................. 323/224, 323/283
See application file for complete search history.

(56) References Cited

U.S. PATENT DOCUMENTS

| 5,726,845 | A | 3/1998 | Ho |
| 6,100,675 | A | 8/2000 | Sudo |
| 6,998,825 | B2 | 2/2006 | Nagaoka et al. |
| 7,045,992 | B1 * | 5/2006 | Silva et al. ............ 323/222 |
| 7,482,789 | B2 | 1/2009 | Motomori et al. |
| 2009/0184699 | A1 | 7/2009 | Natsume et al. |

FOREIGN PATENT DOCUMENTS

JP    11-155281 A    6/1999

OTHER PUBLICATIONS

USPTO, Non-Final Rejection, Jun. 25, 2010, in parent (section 120 priority) U.S. Appl. No. 12/354,413 [pending].

* cited by examiner

*Primary Examiner* — Shawn Riley
(74) *Attorney, Agent, or Firm* — Fujitsu Patent Center

(57) ABSTRACT

A power supply apparatus is provided which includes: a first switch provided between an inductor and a terminal to which a reference voltage is applied; a second switch provided between the inductor and an output terminal; a first comparator circuit that compares an input voltage with a first comparison voltage; a signal generating circuit that outputs a frequency signal according to an output from the first comparator circuit; and a first control circuit that controls the first and second switches based on an output from the signal generating circuit to control an electrical current flowing into the inductor.

13 Claims, 14 Drawing Sheets

POWER SUPPLY APPARATUS AND POWER SUPPLY METHOD

CROSS-REFERENCE TO RELATED APPLICATIONS

This application is a continuation-in-part application of application Ser. No. 12/354,413, filed Jan. 15, 2009 and claims the benefit of priority from Japanese Patent Application No. 2008-326685 filed on Dec. 23, 2008, the entire contents of which are incorporated herein by reference.

BACKGROUND

1. Field

The embodiments discussed herein relate to a power supply apparatus.

2. Description of Related Art

Related techniques are disclosed, for example, in Japanese Laid-open Patent Publication No. H11-155281.

SUMMARY

According to one aspect of the embodiments, a power supply apparatus is provided which includes: a first switch provided between an inductor and a terminal to which a reference voltage is applied; a second switch provided between the inductor and an output terminal; a first comparator circuit that compares an input voltage with a first comparison voltage; a signal generating circuit that outputs a frequency signal according to an output from the first comparator circuit; and a first control circuit that controls the first and second switches based on an output from the signal generating circuit to control an electrical current flowing into the inductor.

Additional advantages and novel features of the invention will be set forth in part in the description that follows, and in part will become more apparent to those skilled in the art upon examination of the following or upon learning by practice of the invention.

DESCRIPTION OF THE EMBODIMENTS

Figure 1:
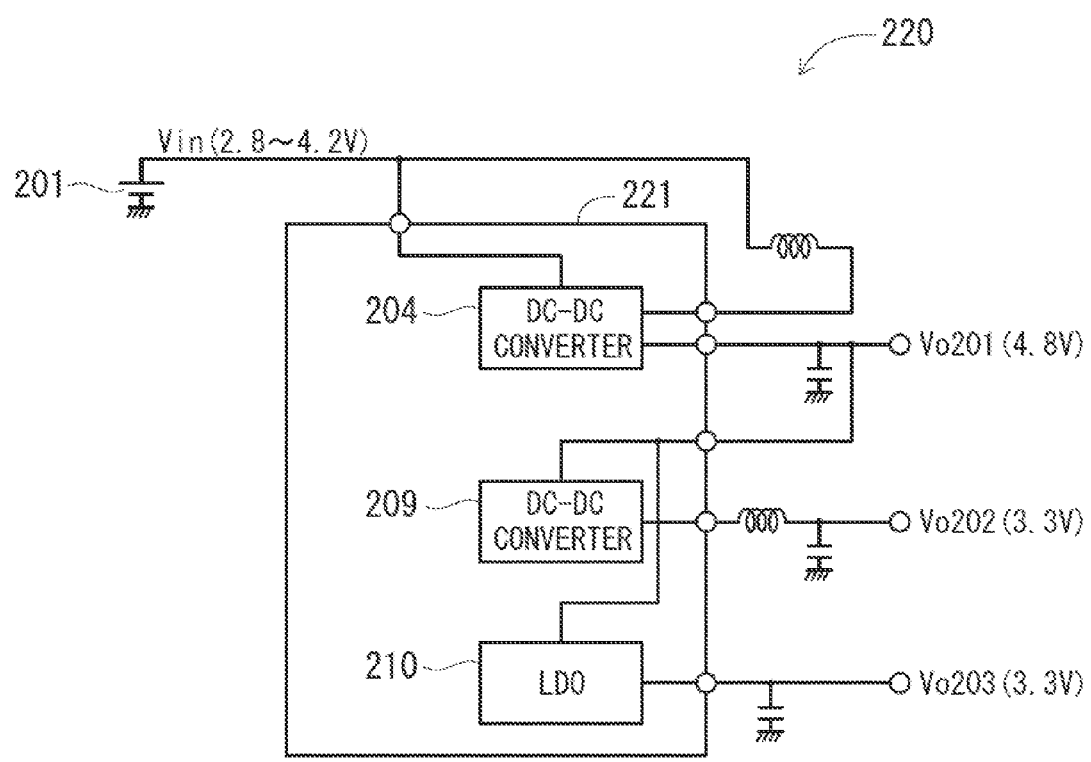
FIG. 1 illustrates an exemplary power supply apparatus.

FIG. 1 illustrates a power supply apparatus. The power supply apparatus illustrated in FIG. 1 may be included in a portable device. The power supply apparatus 220 illustrated in FIG. 1 may be a double conversion power supply. A battery 201 is coupled to the power supply apparatus 220. The battery 201 may be a lithium ion battery of 1 cell. An input voltage Vin supplied from the battery 201 may vary within a range from 2.8 V to 4.2 V. A step-up DC-DC converter 204 steps up the input voltage Vin. An output voltage Vo201 regulated to a set output voltage of 4.8 V is outputted from the DC-DC converter 204. A DC-DC converter 209 steps down the output voltage Vo201 and outputs a target output voltage Vo202 of 3.3 V. An LDO (low-dropout) regulator 210 steps down the output voltage Vo201 and outputs a target output voltage Vo203 of 3.3 V.

In the power supply apparatus 220, voltages equal to or higher than the target output voltages Vo202 and Vo203 are supplied from the DC-DC converter 204 to the DC-DC converter 209 and to the LDO regulator 210. The output voltages Vo202 and Vo203 regulated to a target value of output voltage of 3.3 V are output from the DC-DC converter 209 and the LDO regulator 210, respectively.

Where the input voltage Vin is higher than the target output voltages Vo202 and Vo203, voltages equal to or higher than the target output voltage Vo202 may be supplied to the DC-DC converter 209 without a step-up operation by the DC-DC converter 204. The DC-DC converter 204 may supply voltages equal to or higher than the target output voltage Vo203 to the LDO regulator 210 without a step-up operation. Power loss may occur because the DC-DC converter 204 operates at a constant frequency.

Figure 2:
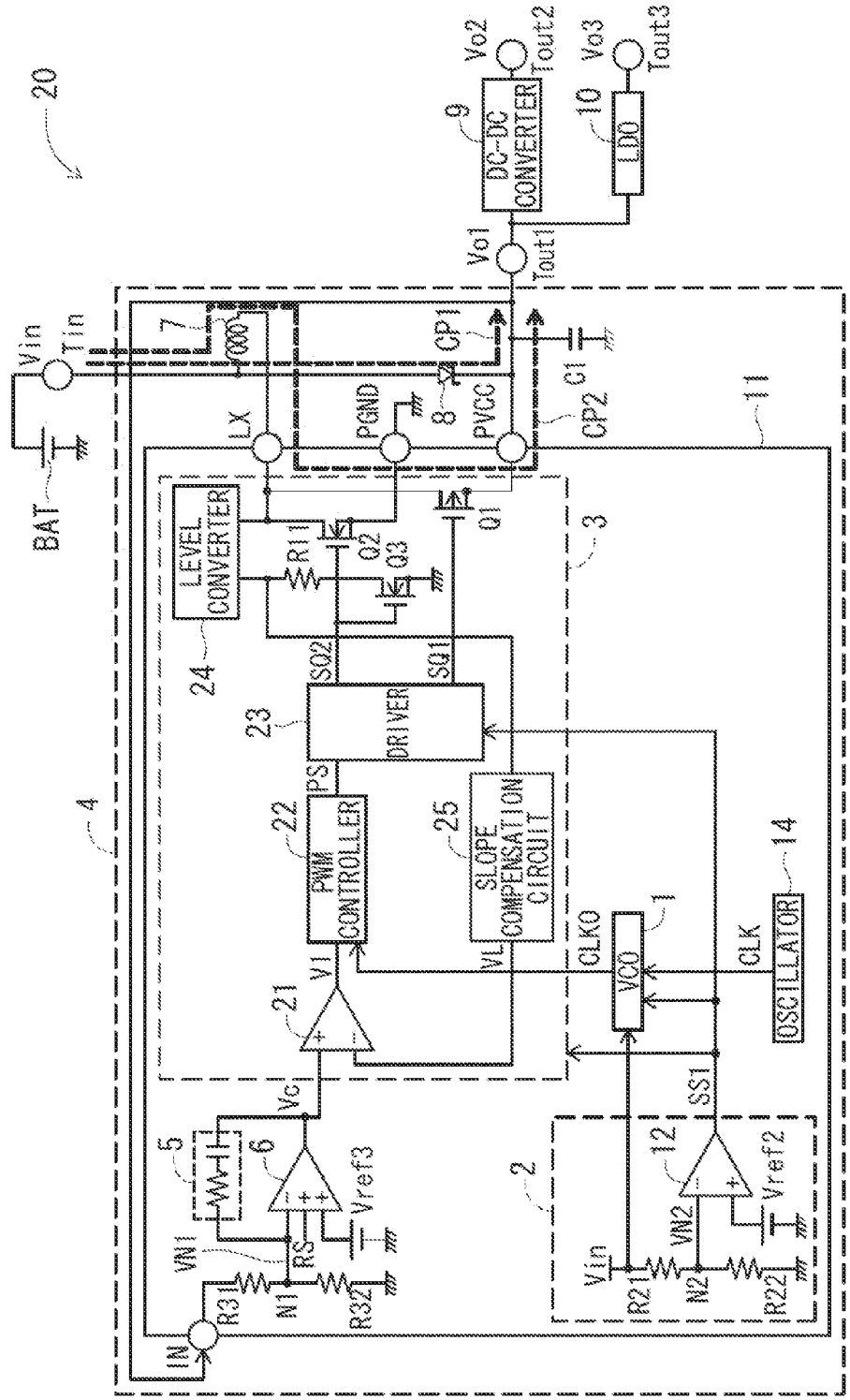
FIG. 2 illustrates a first embodiment.

FIG. 2 illustrates a first embodiment. The power supply apparatus 20 illustrated in FIG. 2 may be a double conversion type. The power supply apparatus 20 includes a battery BAT, a step-up DC-DC converter 4, a step-down DC-DC converter 9, and a low-dropout (LDO) regulator 10. The battery BAT may be a power supply for the power supply apparatus 20. The output terminal of the battery BAT is coupled to the input terminal Tin of the DC-DC converter 4 and an input voltage Vin is supplied. The battery BAT may be a lithium ion battery of 1 cell. The input voltage Vin supplied from the battery BAT may vary within a range from 2.8 V to 4.2 V.

An output terminal Tout1 of the DC-DC converter 4 is coupled to the input terminals of the DC-DC converter 9 and the LDO regulator 10, and an output voltage Vo1 is supplied to these input terminals. The output voltage Vo1 may be a power-supply voltage for the DC-DC converter 9 and LDO regulator 10. The output voltage Vo1 may be a set output voltage Vset, for example, may be equal or higher than 3.65 V. The DC-DC converter 9 steps down the output voltage Vo1. An output voltage Vo1, for example 3.3 V, is output from an output terminal Tout2. The LDO regulator 10 steps down the output voltage Vo1. An output voltage Vo3, for example 3.3 V, is output from the output terminal Tout3. The power supply apparatus 20 outputs the output voltages Vo1 and Vo3 regulated to a target output voltage value, for example 3.3 V.

For a stable step-down operation of the DC-DC converter 9, it is desired that the output voltage Vo1 be higher than the output voltage Vo2 by a given voltage value. For a stable step-down operation of the LDO regulator 10, it is desired that the output voltage Vo1 be higher than the output voltage Vo3 by a given voltage value or more. The given voltage for the stable operation of the DC-DC converter 9 and LDO regulator 10 may be 0.3 V, for example. The set output voltage Vset may be higher than the target value 3.3 V of the output voltages Vo1 and Vo3 by a given voltage value of 0.3 V or more. For example, Vset may be set to 3.65 V. The output voltage Vo1 may be higher than 3.65 V.

The DC-DC converter 4 includes a coil 7, a Schottky barrier diode (SBD) 8, an output capacitor C1, a control circuit 11, the input terminal Tin, and the output terminal Tout1. One end of the coil 7 is coupled to a terminal LX of the control circuit 11. The other end of the coil 7 is coupled to the input terminal Tin and the anode terminal of the Schottky barrier diode 8. The cathode terminal of the Schottky barrier diode 8, output capacitor C1, and terminals PVCC and IN of the control circuit 11 are coupled to the output terminal Tout1. A terminal PGND of the control circuit 11 is grounded.

The control circuit 11 includes a voltage-controlled oscillator (VCO) 1, a comparator circuit 2, a switching control circuit 3, resistive elements R31 and R32, an error amplifier 6, a phase compensation circuit 5, and an oscillator 14.

The comparator circuit 2 includes a comparator 12, resistive elements R21 and R22, and a reference voltage source for producing a reference voltage Vref2. The input voltage Vin is applied to one end of the resistive element R21 and the other end of the resistive element R21 is coupled to one end of the resistive element R22 via a node N2. The other end of the resistive element R22 is grounded. The resistive elements R21 and R22 are voltage-dividing resistors for dividing the input voltage Vin. For example, a voltage VN2 obtained by the voltage division when the input voltage Vin is 4.0 V may be set substantially equal to the reference voltage Vref2. An inverting input terminal of the comparator 12 is coupled to the node N2 and the divided voltage VN2 is supplied. The reference voltage Vref2 is supplied to a non-inverting input terminal of the comparator 12. The comparator 12 compares the divided voltage VN2 with the reference voltage Vref2. When the voltage VN2 is lower than the reference voltage Vref2, the comparator outputs a signal SS1 at a high level. When the voltage VN2 is higher than the reference voltage Vref2, the comparator outputs the signal SS1 at a low level. The signal SS1 is supplied to the VCO 1, the switching control circuit 3, and a driver 23.

The signal SS1 is supplied to the VCO 1. A clock signal CLK from the oscillator 14 is supplied to the VCO 1. The frequency of the clock signal CLK may be 1.25 MHz, for example. The VCO 1 outputs a control clock signal CLKO.

The terminal IN is coupled to one end of the resistive element R31. The other end of the terminal IN is coupled to one end of the resistive element R32 via the node N1. The other end of the resistive element R32 is grounded. The resistive elements R31 and R32 are voltage-dividing resistors for dividing the output voltage Vo1. The difference between the voltage VN1 and a reference voltage Vref3 is amplified. The error amplifier 6 may be a voltage amplifier including two non-inverting inputs and one inverting input. The node N1 is coupled to the inverting input of the error amplifier 6. The reference voltage Vref3 is supplied to one of the two non-inverting inputs of the error amplifier 6. A ramp control signal RS from a ramp control circuit (not shown), for example, is supplied to the other non-inverting input of the error amplifier 6. Priority is given, for example, to a lower level signal appearing at the two non-inverting inputs of the error amplifier 6. The amplifier amplifies the difference between the lower one of the voltages appearing at the two non-inverting inputs and the voltage at the inverting input. The phase compensation circuit 5 is coupled between the output terminal and inverting input terminal of the error amplifier 6. An output voltage Vc from the error amplifier 6 is supplied to the switching control circuit 3.

The switching control circuit 3 includes a comparator 21, a PWM controller 22, the driver 23, a level converter 24, a slope compensation circuit 25, transistors Q1 to Q3, and a sense resistor R11. The slope compensation circuit 25 prevents subharmonic oscillations. The output terminal of the error amplifier 6 is coupled to the non-inverting input terminal of the comparator 21. The output voltage Vc is supplied to the non-inverting input terminal. The output terminal of the slope compensation circuit 25 is coupled to the non-inverting input terminal of the comparator 21 and an output voltage VL is supplied. The comparator 21 outputs an output voltage V1. The output voltage V1 and the control clock signal CLKO are supplied to the PWM controller 22 and a PWM signal PS is output. The PWM signal PS and signal SS1 are supplied to the driver 23 and gate signals SQ1 and SQ2 are output.

The source terminal of the PMOS transistor Q1 is coupled to a terminal PVCC. The drain terminal of the PMOS transistor Q1 is coupled to a terminal LX. The drain terminal of the NMOS transistor Q2 is coupled to the terminal LX and the level converter 24. The source terminal of the NMOS transistor Q2 is coupled to the terminal PGND. The drain terminal of the NMOS transistor Q3 is coupled to the level converter 24 and the slope compensation circuit 25 via the sense resistor R11. The source terminal of the NMOS transistor Q3 is grounded.

Figure 3:
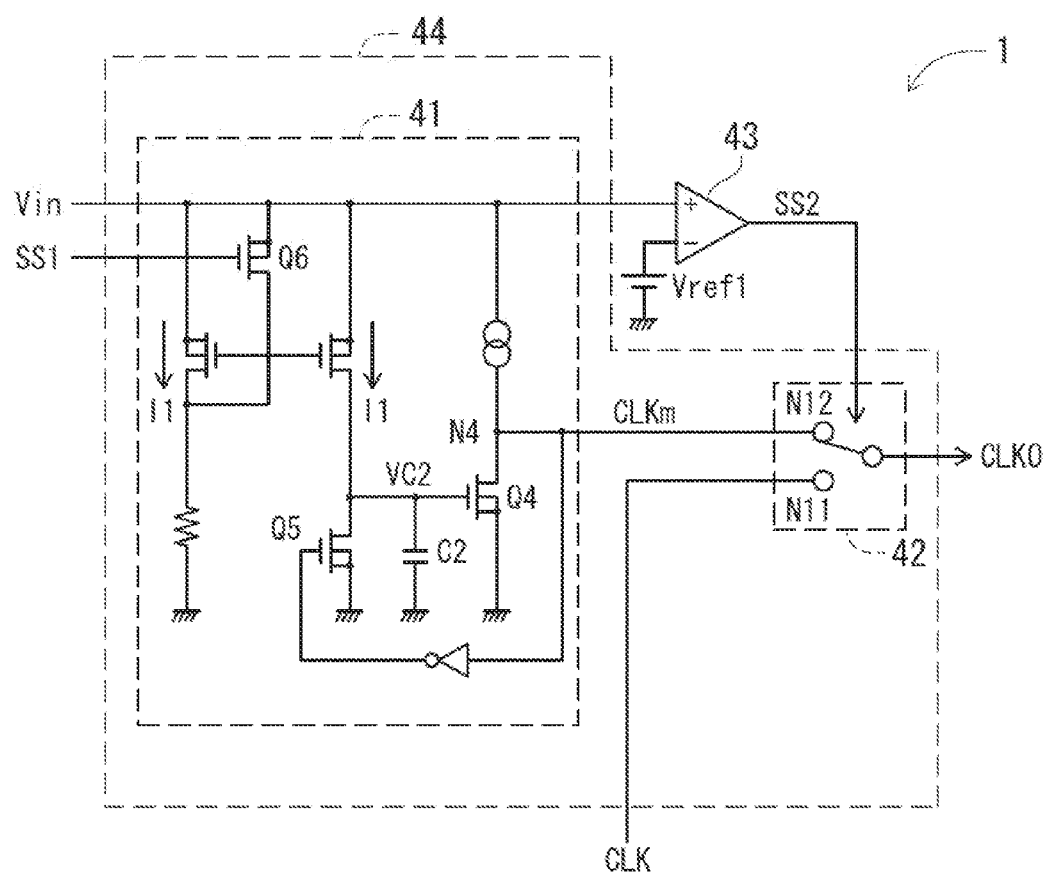
FIG. 3 illustrates an exemplary VCO.

FIG. 3 illustrates an exemplary VCO. The VCO 1 includes a comparator 43 and a clock signal generating circuit 44. A reference voltage Vref1, for example, of 3.2 V is supplied to the inverting input terminal of the comparator 43. The input voltage Vin is supplied to the non-inverting input terminal of the comparator 43. The comparator 43 outputs a signal SS2. The clock signal generating circuit 44 includes a voltage-controlled oscillator circuit 41 and a switching circuit 42. The voltage-controlled oscillator circuit 41 varies the frequency of the clock signal according to the value of the input voltage Vin. The oscillator circuit 41 outputs a modulated clock signal CLKm whose frequency drops linearly with an increase in the input voltage Vin. The modulated clock signal CLKm is supplied to a node N12 of the switching circuit 42. The clock signal CLK is supplied to a node N11. The signal SS2 is supplied to the switching circuit 42. The switching circuit 42 selects one of the clock signal CLK or the modulated clock signal CLKm according to the signal SS2, and outputs the selected signal as the control clock signal CLKO.

Figure 4:
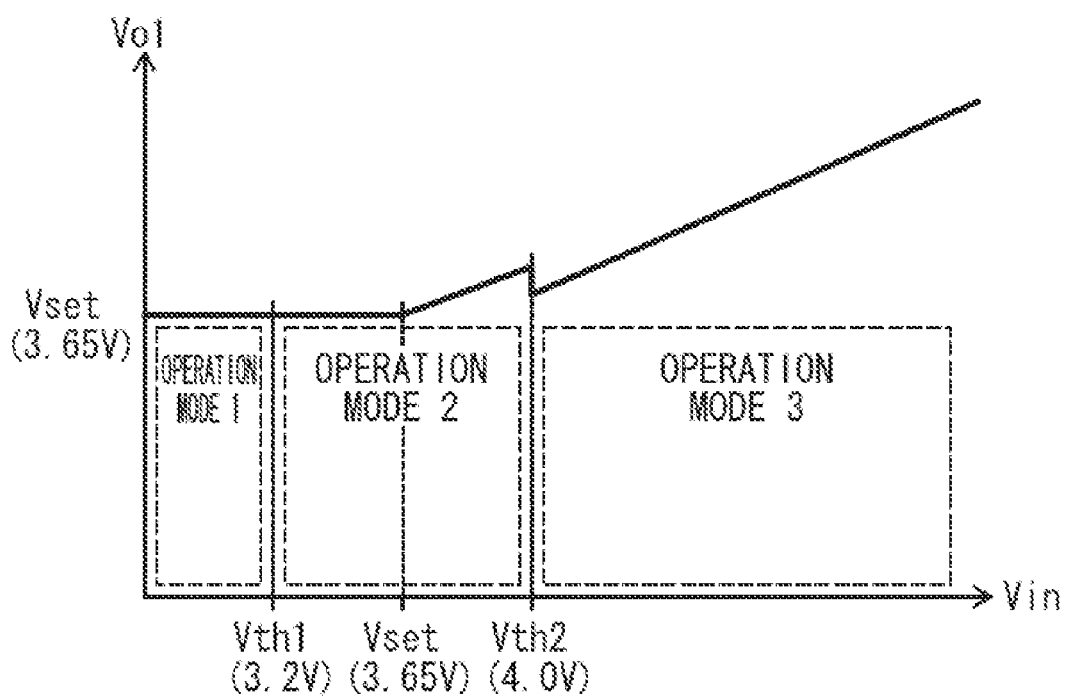
FIG. 4 illustrates an exemplary operation of a power supply apparatus.

FIG. 4 illustrates an exemplary operation of a power supply apparatus. The power supply apparatus illustrated in FIG. 2 may perform the operation illustrated in FIG. 4. Under the condition where input voltage Vin<threshold voltage Vth1, the DC-DC converter 4 performs a PWM operation at a given frequency. The operation under this condition may be referred to as operation mode 1. The threshold voltage Vth1 may be set to 3.2 V, for example. In the operation mode 1, the operating frequency may be set to 1.25 MHz, for example.

Under the condition where threshold voltage Vth1≦input voltage Vin<threshold voltage Vth2, the DC-DC converter 4 performs a PWM operation at a frequency lowered according to the input voltage Vin. The operation performed under this condition may be referred to as operation mode 2. The threshold voltage Vth2 may be set to 4.0 V.

Under the condition where input voltage Vin≧threshold voltage Vth2, operation of the DC-DC converter 4 comes to a halt. The operation under this condition may be referred to as operation mode 3.

Figure 5:
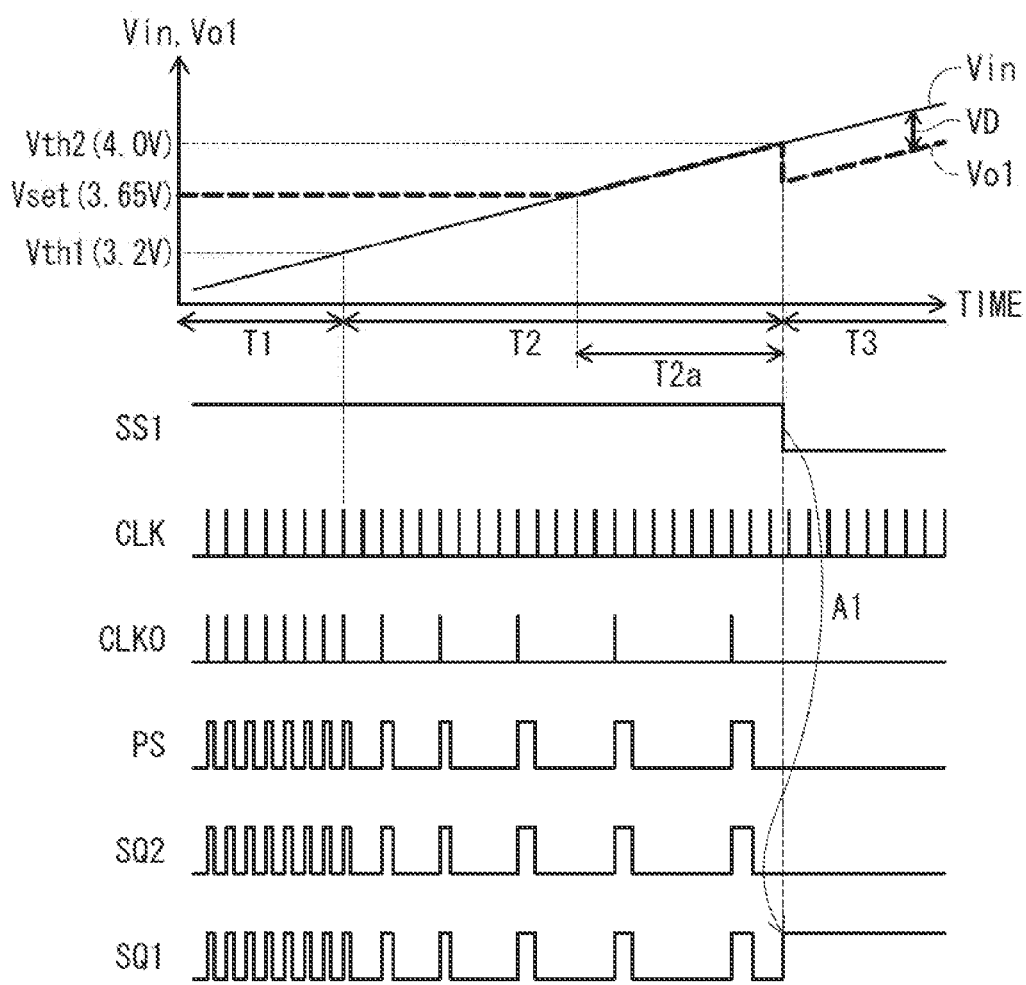
FIG. 5 illustrates an exemplary operation of a power supply apparatus.

FIG. 5 illustrates an exemplary operation of a power supply apparatus. The power supply apparatus illustrated in FIG. 2 may perform the operation illustrated in FIG. 4. In the waveform chart of FIG. 5, the input voltage Vin varies from a value equal to or lower than the threshold voltage Vth1 to a value equal to or higher than the threshold voltage Vth2 with the lapse of time. The interval given by input voltage Vin<threshold voltage Vth1 of 3.2 V may be referred to as period T1 illustrated in FIG. 5. During the period T1, the DC-DC converter 4 operates in the operation mode 1, for example. The comparator 12 of the comparator circuit 2 illustrated in FIG. 2 compares a divided voltage VN2 with the reference voltage Vref2 and outputs the high-level signal SS1. In response to the high-level signal SS1, a transistor Q6 of the voltage-controlled oscillator circuit 41 of the VCO 1 becomes non-conductive, and the voltage-controlled oscillator circuit 41 operates. In response to the high-level signal SS1, the switching control circuit 3 also operates.

The comparator 43 of the VCO 1 illustrated in FIG. 3 detects that the input voltage Vin is lower than 3.2 V, for example, and outputs the low-level signal SS2. In response to the low-level signal SS2, the switching circuit 42 selects the node N11. The clock signal CLK having a frequency of 1.25 MHz, for example, is output as the control clock signal CLKO.

The error amplifier 6 illustrated in FIG. 2 compares the divided voltage VN1 with the reference voltage Vref3 and outputs the output voltage Vc. The comparator 21 compares the output voltages Vc and VL and outputs the output voltage V1. The PWM controller 22 generates the PWM signal PS based on the control clock signal CLKO and the output voltage V1. The frequency of the PWM signal PS is determined based on the control clock signal CLKO. The pulse width of the PWM signal PS is determined based on the output voltage V1. The PWM signal PS is amplified by the driver 23 and are output as the gate signals SQ1 and SQ2. In the operation mode 1, the operating frequency of the transistors Q1-Q3 may be 1.25 MHz, for example.

During a period in which the gate signals SQ1 and SQ2 are at a high level, the transistor Q1 becomes non-conductive and the transistors Q2 and Q3 become conductive. Electrical current flows into the coil 7 via the transistor Q2 and energy is stored in the coil 7. The coil current reduced at a given ratio in the level converter 24 flows into the sense resistor R11 via the transistor Q3. A voltage corresponding to the coil current is output from the sense resistor R11 and supplied to the comparator 21 via the slope compensation circuit 25.

During a period in which the gate signals SQ1 and SQ2 are at a low level, the transistor Q1 becomes conductive and the transistors Q2 and Q3 become non-conductive. A current supply path CP2 is formed from the coil 7 to the output terminal Tout1 via the terminal LX, transistor Q1, and terminal PVCC. Energy stored in the coil 7 is released to the output terminal Tout1 through the current supply path CP2.

The period in which the relationship, threshold voltage Vth1 (3.2 V)≦input voltage Vin<threshold voltage Vth2 (4.0 V), holds may represent a period T2 illustrated in FIG. 5. During the period T2, the DC-DC converter 4 operates, for example, in the operation mode 2. The comparator 12 of the comparator circuit 2 illustrated in FIG. 2 outputs the high-level signal SS1. The VCO 1 and switching control circuit 3 operate.

The comparator 43 of the VCO 1 illustrated in FIG. 3 detects that the input voltage Vin is equal to or greater than 3.2 V, for example, and outputs the high-level signal SS2. In response to the high-level signal SS2, the switching circuit 42 selects the node N12. The modulated clock signal CLKm output from the voltage-controlled oscillator circuit 41 is output as the control clock signal CLKO.

During a period in which the transistor Q4 is non-conductive, the modulated clock signal CLKm may be at high level. Because the transistor Q5 turns off, an electrical current I1 corresponding to the input voltage Vin flows into the capacitor C2, thereby charging the capacitor C2. The output voltage VC2 from the capacitor C2 rises and the transistor Q4 turns on. The modulated clock signal CLKm becomes low level, the transistor Q5 becomes conductive, and the capacitor C2 is discharged. When the output voltage VC2 from the capacitor C2 drops and the transistor Q4 turns off again, the modulated clock signal CLKm becomes high level and the capacitor C2 is charged. The modulated clock signal CLKm whose frequency is varied linearly according to the value of the input voltage Vin is output from the voltage-controlled oscillator circuit 41.

The frequency of the modulated clock signal CLKm may be 980 kHz, for example, when the input voltage Vin=3.2 V. For example, when the input voltage Vin=4.0 V, the frequency may be 420 kHz. When the input voltage Vin is, for example, in a range of from 3.2 V to 4.0 V, the frequency of the modulated clock signal CLKm may vary linearly according to variation in the input voltage Vin within a range of from 980 kHz to 420 kHz, for example. In the operation mode 2, the operating frequency of the transistors Q1 to Q3 may be 980 kHz to 420 kHz, for example. In the operation mode 2, energy stored in the coil 7 is released to the output terminal Tout1 through the current supply path CP2.

In the operation mode 2, during a period T2a illustrated in FIG. 5 in which the relationship, set output voltage Vset (e.g., 3.65 V)<input voltage Vin<threshold voltage Vth2 (e.g., 4.0 V), holds, the input voltage Vin is higher in value than the set output voltage Vset. The Schottky barrier diode (SBD) 8 illustrated in FIG. 2 becomes conductive and the current supply path CP1 is formed from the input terminal Tin to the output terminal Tout1 via the SBD 8. During the period T2a, energy is released to the output terminal Tout1 through the two current supply paths CP1 and CP2. The value of the output voltage Vo1 may be substantially identical with the input voltage Vin.

The relationship, input voltage Vin≧threshold voltage Vth2 (e.g., 4.0 V), may hold during a period T3 illustrated in FIG. 5. During the period T3 illustrated in FIG. 5, the DC-DC converter 4 operates, for example, in the operation mode 3. The comparator 12 of the comparator circuit 2 illustrated in FIG. 2 outputs the low-level signal SS1. In response to the low-level signal SS1, the transistor Q6 of the voltage-controlled oscillator circuit 41 of the VCO 1 becomes conductive and the voltage-controlled oscillator circuit 41 stops. The modulated clock signal CLKm is kept at a low level. In response to the low-level signal SS1, operation of the switching control circuit 3 also stops.

The comparator 43 of the VCO 1 illustrated in FIG. 3 outputs the high-level signal SS2. In response to the high-level signal SS2, the switching circuit 42 selects the node N12. The modulated lock signal CLKm maintained at la ow level is output as the control clock signal CLKO. The PWM signal PS and gate signal SQ2 are also maintained in a low level. The NMOS transistors Q2 and Q3 turn off. The driver 23 maintains the gate signal SQ1 at a high level based on the low-level signal SS1 (arrow A1 of FIG. 5). Therefore, the PMOS transistor Q1 turns off. The switching control circuit 3 stops. The current supply path CP2 is cut off.

In the operation mode 3, the input voltage Vin is higher in value than the output voltage Vo1. The Schottky barrier diode (SBD) 8 illustrated in FIG. 2 becomes conductive and the current supply path CP1 is formed. In the operation mode 3, electrical current is supplied from the input terminal Tin to the output terminal Tout1 through the current supply path CP1. The output voltage Vo1 may be substantially equal to a voltage which is obtained by subtracting the voltage drop value VD at the SBD 8, for example 0.3 V, from the input voltage Vin.

Figure 6:
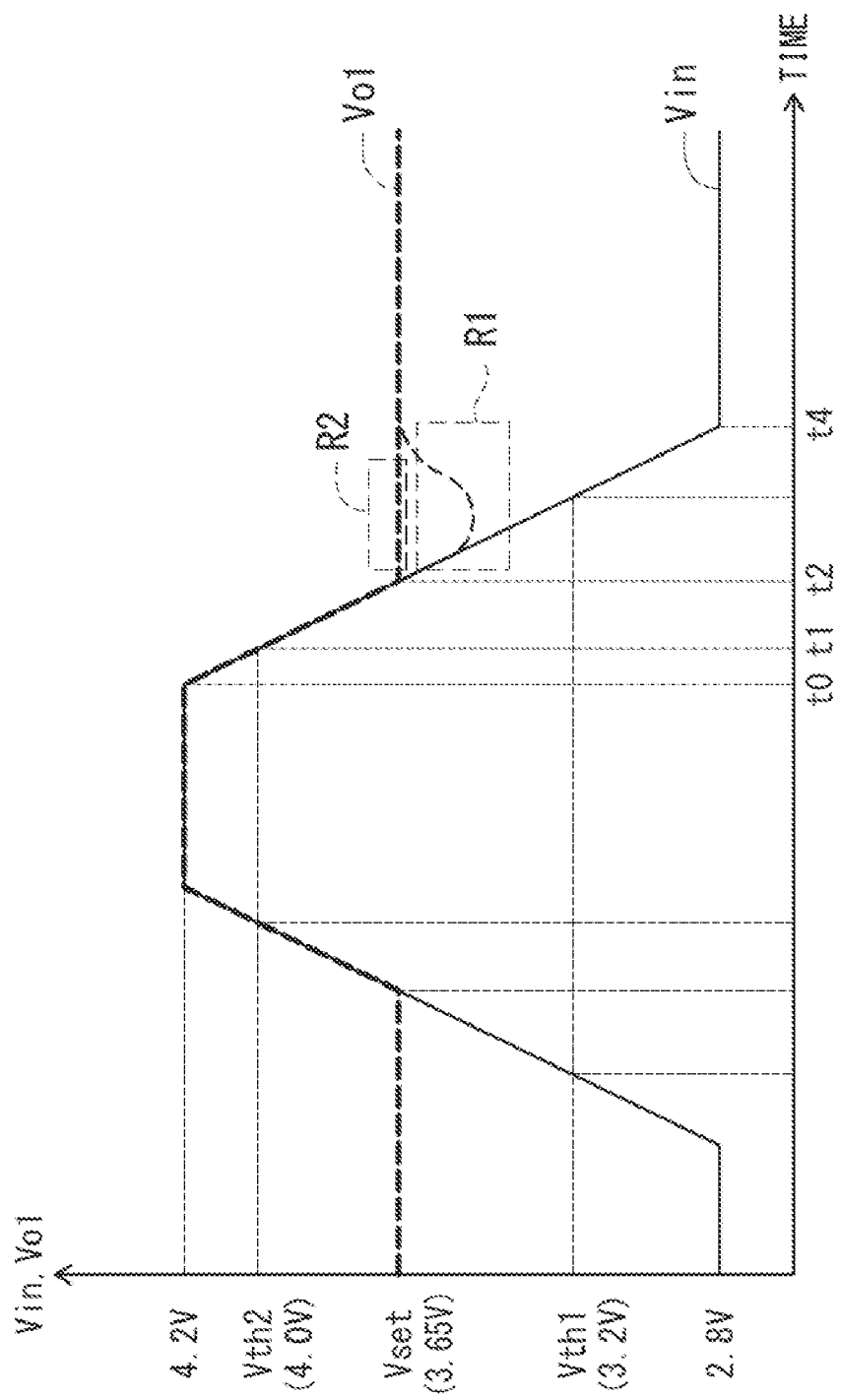
FIG. 6 illustrates an exemplary relationship between an input voltage and an output voltage.

FIG. 6 illustrates an exemplary relationship between the input voltage and output voltage. Even if the input voltage Vin varies, for example, from 2.8 V to 4.2 V, the output voltage Vo1 is equal to or greater than the set output voltage Vset, for example, 3.65 V.

In the step-up DC-DC converter 4, when the input voltage Vin is higher than the set output voltage Vset, the SBD 8 becomes conductive and the current supply path CP1 is formed. Electrical current is supplied from the input terminal Tin to the output terminal Tout1 through the current supply path CP1. The control circuit 11 of the DC-DC converter 4 outputs an output voltage VO1 equal to or higher than the set output voltage Vset without performing a step-up operation. For example, if the switching control circuit 3 operates at a given frequency, power loss may occur.

In the DC-DC converter 4, if the comparator 43 of the VCO 1 outputs a comparison result indicating that the input voltage Vin is higher than the threshold voltage Vth1, the clock signal generating circuit 44 outputs the control clock signal CLKO having a lowered frequency. According to the result of comparison between the input voltage Vin and the threshold voltage Vth1, the operating frequency of the switching operation of the switching control circuit 3 drops. Where the input voltage Vin is higher than the set output voltage Vset, power loss may occur.

In the step-up DC-DC converter, as the input voltage rises and approaches the set output voltage, the duty cycle of the PWM operation decreases. If the duty cycle decreases to a minimum on-pulse time, the operation becomes unstable and ripples on the output voltage may occur. Since, in the DC-DC converter 4, it is detected that the input voltage Vin is greater than the threshold voltage Vth1, it is also detected that the input voltage Vin has increased and approached the set output voltage Vset. Operation in the operation mode 2 is performed. The frequency of the control clock signal CLKO decreases with increasing the input voltage Vin. As the frequency of the control clock signal CLKO drops, the on-pulse time increases. This prevents the PWM operation from being performed at the minimum on-pulse time. Consequently, the DC-DC converter 4 operates stably.

Where the input voltage Vin is equal or less than the threshold voltage Vth1, it is desired that the DC-DC converter 4 operates with the control clock signal CLKO having the frequency, for example, 1.25 MHz, which corresponds to a frequency not yet lowered. In order that the DC-DC converter 4 operates stably with the control clock signal CLKO, for example, of 1.25 MHz, preferably there is a differential voltage between the input voltage Vin and the set output voltage value Vset. Preferably, the value of the threshold voltage Vth1 is set to a value equal to or lower than a value obtained by subtracting the differential voltage from the set output voltage Vset. The differential voltage permitting stable operation of the DC-DC converter 4 may be 0.4 V, for example. The value of the threshold voltage Vth1 may be set to a value, for example, 3.2 V, substantially equal to or lower than a value obtained by subtracting the differential voltage, for example, 0.4 V, from the set output voltage Vset, for example, 3.65 V.

In the DC-DC converter 4, when a comparison result indicating that the input voltage Vin is higher than the threshold voltage Vth2 is output from the comparator circuit 2, the clock signal generating circuit 44 stops outputting the control clock signal CLKO. Consequently, the switching control circuit 3 stops. Operation in the operation mode 3 is performed. Even if the switching control circuit 3 is not in operation, electrical current is supplied from the input terminal Tin to the output terminal Tout1 through the current supply path CP1. The DC-DC converter 4 outputs the output voltage Vo1 that is substantially the same as the input voltage Vin. The switching control circuit 3 is deactivated depending on the result of the comparison between the input voltage Vin and the threshold voltage Vth2. Hence, power loss may be reduced.

Preferably, the output voltage Vo1 is equal to or higher than the set output voltage Vset. In the operation mode 3, the output voltage Vo1 may be a value obtained, for example, by subtracting a voltage drop value VD across the SBD 8 illustrated in FIG. 2 from the input voltage Vin. Preferably, the value of the threshold voltage Vth2 is a value equal to or higher than a value obtained by adding the voltage drop value VD to the set output voltage Vset. The value of the voltage drop VD may be 0.3 V, for example. The value of the threshold voltage Vth2 may be a value equal to or higher than a value obtained, for example, by adding 0.3 V to the set output voltage Vset, for example, 3.65 V. For example, the value may be set to 4.0 V.

During a period from instant t0 to t4 illustrated in FIG. 6, the input voltage Vin may drop, for example, from 4.2 V to 2.8 V. During a period from instant t0 to t2 in which the relationship, input voltage Vin>set output voltage Vset, holds, the switching control circuit 3 does not operate. Electrical current is supplied to the output terminal Tout1 through the current supply path CP1. At instant t2, the switching control circuit 3 is activated. Since a step-up operation is not performed immediately after the start of operation of the control circuit 3, an overshoot on the output voltage Vo1 as indicated in a region R1 may occur.

In the DC-DC converter 4 illustrated in FIG. 2, the switching control circuit 3 is activated, for example, at the instant t1 at which the input voltage Vin is equal to or lower than the threshold voltage Vth2. At the instant t2, the DC-DC converter 4 is already in operation and performs a step-up operation. Overshoot of the output voltage Vo1 may be prevented as illustrated in a region R2. The DC-DC converter 4 is put on standby when the relationship, set output voltage Vset<input voltage Vin<threshold voltage Vth2, holds. Therefore, the response speed, when the input voltage Vin decreases rapidly, is enhanced.

Figure 7:
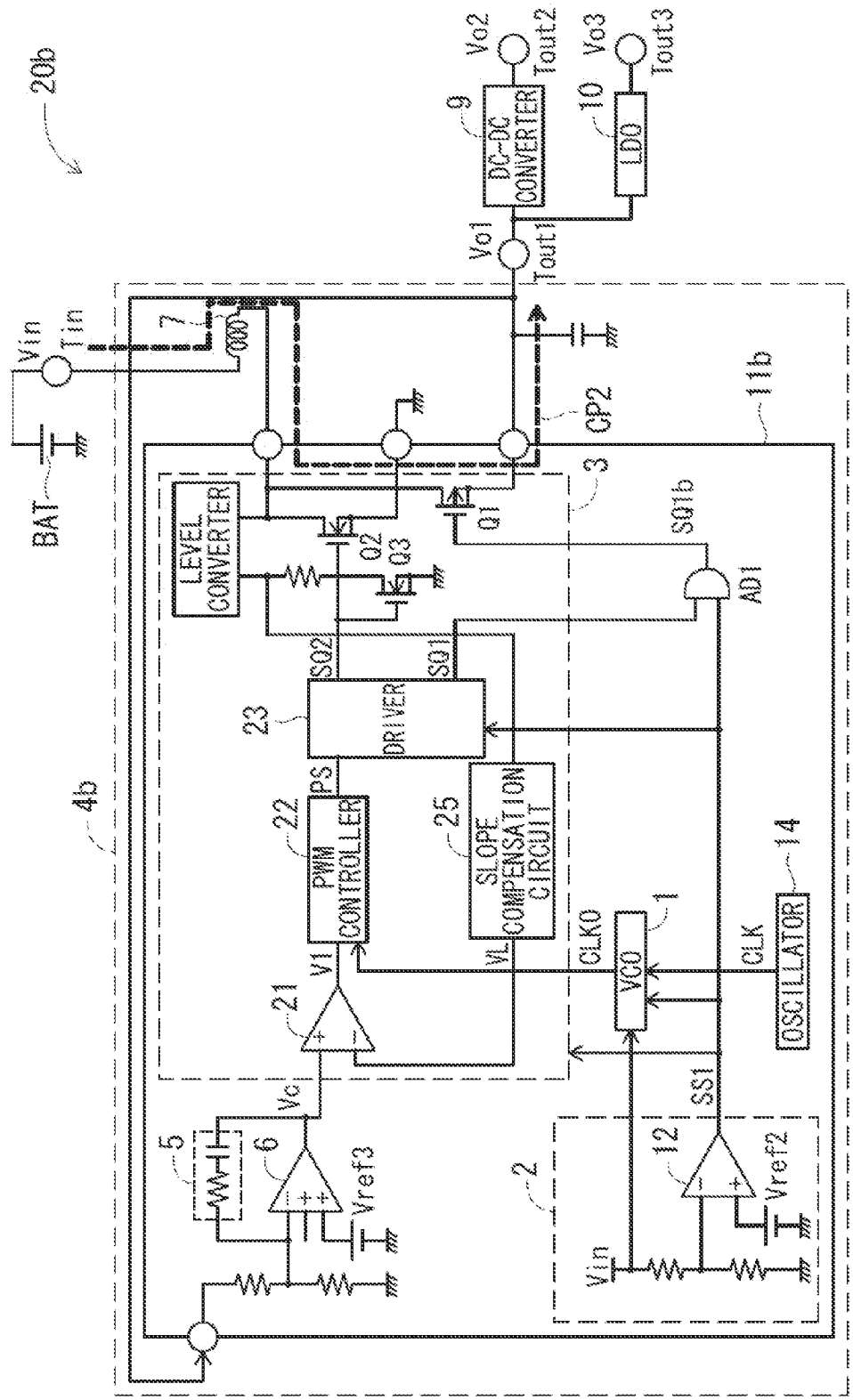
FIG. 7 illustrates a second embodiment.

FIG. 7 illustrates a second embodiment. FIG. 7 illustrates a power supply apparatus 20b of the double conversion type. A DC-DC converter 4b of the power supply apparatus 20b may not include a circuit corresponding to the Schottky barrier diode (SBD) 8 illustrated in FIG. 2. The control circuit 11b includes an AND circuit AD1. The signal SS1 and gate signal SQ1 are supplied to the AND circuit AD1, and the AND circuit AD1 outputs a gate signal SQ1b that is supplied to the gate terminal of the transistor Q1. The other elements illustrated in FIG. 6 may be substantially the same or similar to the corresponding elements of the power supply apparatus 20 of the first embodiment.

Figure 8:
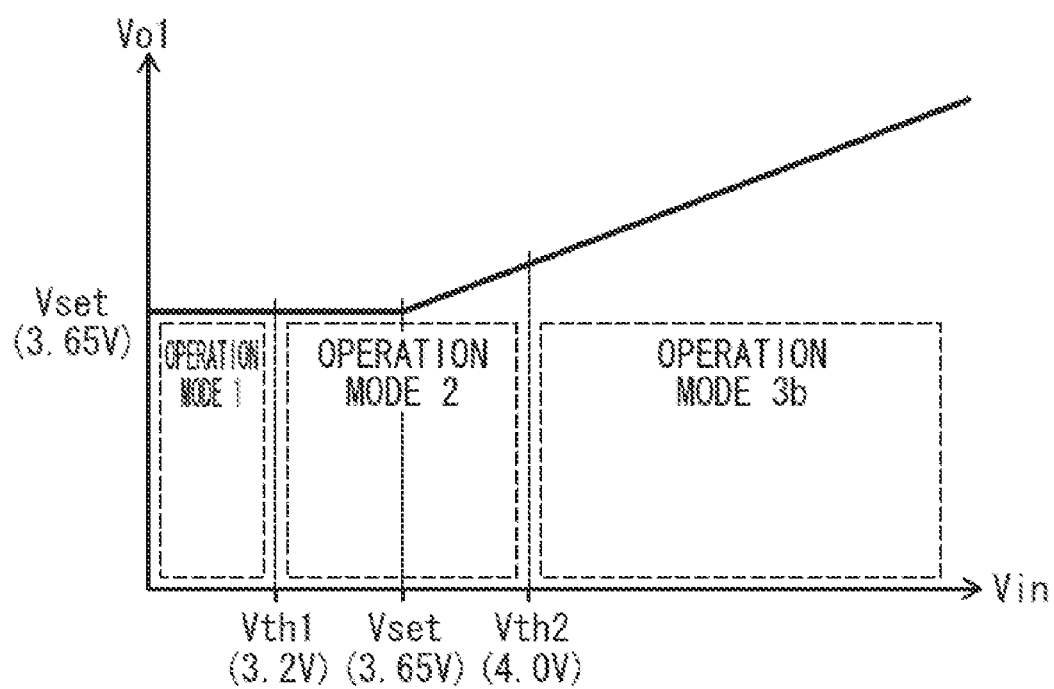
FIG. 8 illustrates an exemplary operation of a power supply apparatus.

FIG. 8 illustrates an exemplary operation of a power supply apparatus. The power supply apparatus 20b illustrated in FIG. 7 may perform the operation illustrated in FIG. 8. Where the relationship, input voltage Vin<threshold voltage Vth1, holds, the DC-DC converter 4b performs a PWM operation at a given frequency. Operation under this condition may be defined as the operation mode 1.

Where the relationship, threshold voltage Vth1≦input voltage Vin<threshold voltage Vth2, holds, the DC-DC converter 4b performs a PWM operation at a frequency lowered according to the input voltage Vin. Operation performed under this condition may be defined as operation mode 2.

Where input voltage Vin≧threshold voltage Vth2, the DC-DC converter 4b is deactivated. The transistor Q1 turns on. Operation under this condition may be defined as operation mode 3b.

Figure 9:
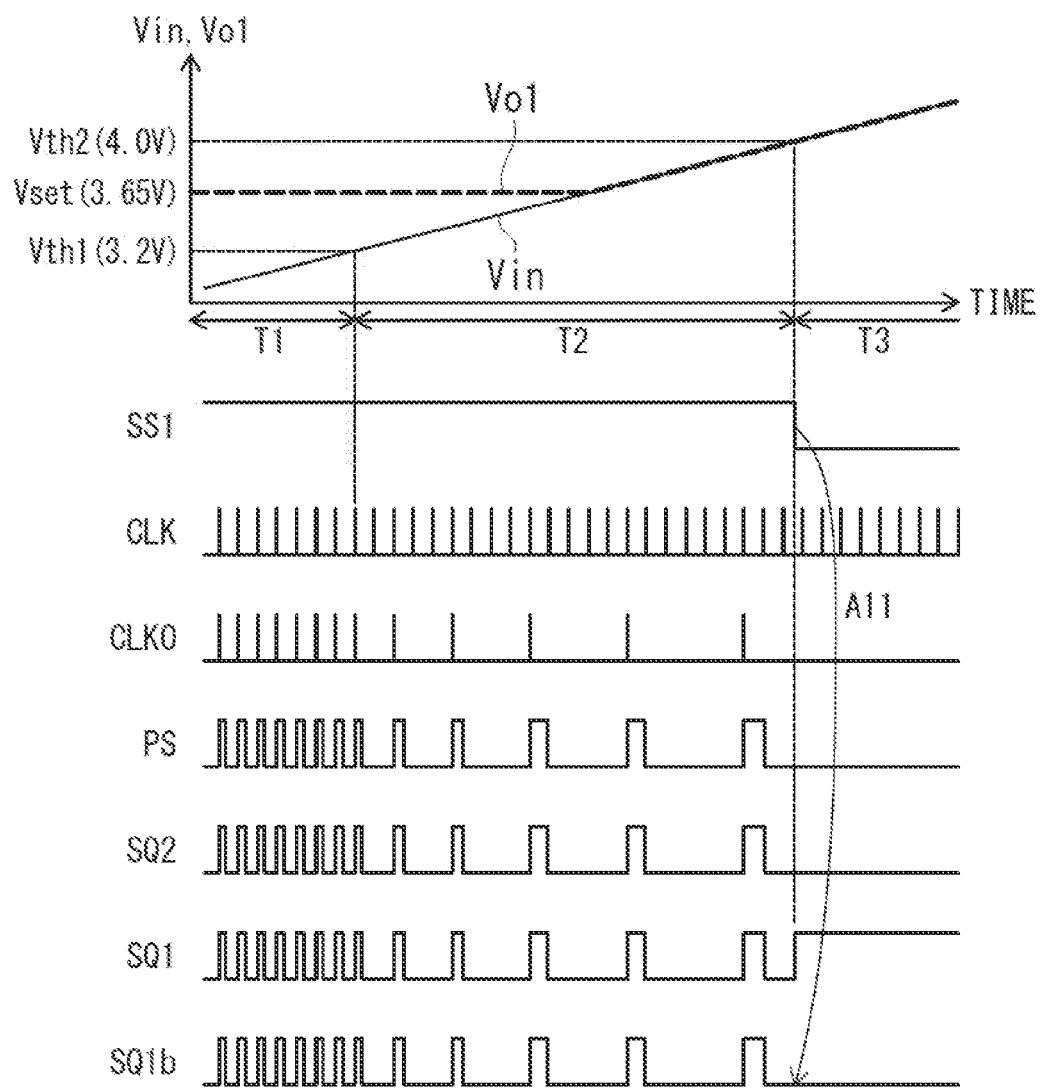
FIG. 9 illustrates an exemplary operation of a power supply apparatus.

FIG. 9 illustrates an exemplary operation of a power supply apparatus. The power supply apparatus 20b illustrated in FIG. 7 may perform the operation illustrated in FIG. 9. During period T1 in which the relationship, input voltage Vin<threshold voltage Vth1, for example, 3.2 V, holds, the DC-DC converter 4b operates in the operation mode 1. The operating frequency of the transistors Q1-Q3 may be 1.25 MHz, for example. Energy stored in the coil 7 is released to the output terminal Tout1 through the current supply path CP2.

During the period T2 in which the relationship, threshold voltage Vth1, for example, 3.2 V≦input voltage Vin<threshold voltage Vth2, for example, 4.0 V, holds, the DC-DC converter 4b operates in the operation mode 2. The operating frequency of the transistors Q1 to Q3 is in a range, for example, of from 980 kHz to 420 kHz. In the operation mode 2, energy stored in the coil 7 is released to the output terminal Tout1 through the current supply path CP2.

During the period T3 in which the relationship, input voltage Vin threshold voltage Vth2, for example, 4.0 V, holds, the DC-DC converter 4b operates in the operation mode 3b. The comparator 12 of the comparator circuit 2 outputs the low-level signal SS1. In response to the low-level signal SS1, operation of the switching control circuit 3 stops. In response to the low-level signal SS1, operation of the VCO 1 stops and the modulated clock signal CLKm becomes low level. The PWM signal PS and gate signal SQ2 become low level and the NMOS transistors Q2 and Q3 turn off.

The driver 23 outputs the high-level gate signal SQ1 based on the low-level signal SS1. The AND circuit AD1 masks the gate signal SQ1 according to the low-level signal SS1, causing the gate signal SQ1b to become low level as indicated by the arrow A11 of FIG. 9. Because the PMOS transistor Q1 turns on, the current supply path CP2 is formed. In the operation mode 3b, electrical current is supplied from the input terminal Tin to the output terminal Tout1 through the current supply path CP2.

As for the DC-DC converter 4b corresponding to the second embodiment, in the operation mode 3b in which the input voltage Vin is higher than the threshold voltage Vth2, the switching control circuit 3 stops. The PMOS transistor Q1 in the switching control circuit 3 becomes conductive and the current supply path CP2 is formed. Electrical current is supplied from the input terminal Tin to the output terminal Tout1 through the current supply path CP2. The switching transistor Q1 for the DC-DC converter 4b is also used as a switch for forming the current supply path CP2. Because the DC-DC converter of the second embodiment does not include the SBD 8 forming the current supply path CP1, the number of elements may be reduced.

Figure 10:
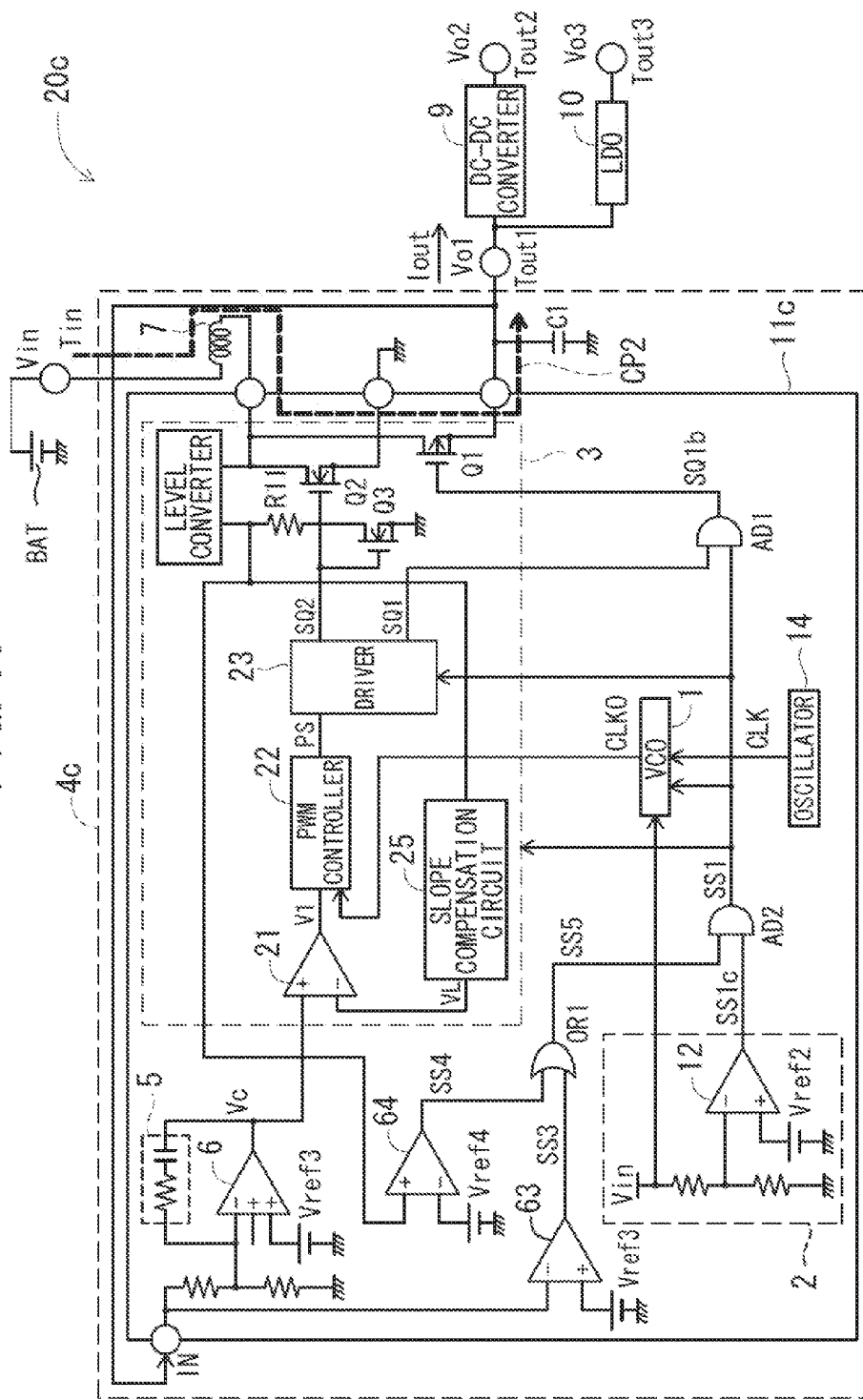
FIG. 10 illustrates a third embodiment.

FIG. 10 illustrates a third embodiment. FIG. 10 illustrates a power supply apparatus 20c of the double conversion type. A control circuit 11c of a DC-DC converter 4c in the power supply apparatus 20c includes a comparator circuit 63, a comparator circuit 64, an OR circuit OR1, and an AND circuit AD2. The output voltage Vo1 is supplied to the inverting input terminal of the comparator circuit 63 via the terminal IN. The reference voltage Vref3 is supplied to the non-inverting input terminal of the comparator circuit 63. A reference voltage Vref4 is supplied to the inverting input terminal of the comparator circuit 64. The drain terminal of the NMOS transistor Q3 is coupled to the non-inverting input terminal of the comparator circuit 64 via the sense resistor R11. The reference voltage Vref4 corresponds to a threshold current Ith for a load current Iout. The comparator circuit 64 compares the load current Iout and threshold current Ith. An output signal SS3 from the comparator circuit 63 and an output signal SS4 from the comparator circuit 64 are supplied to the OR circuit OR1. An output signal SS5 from the OR circuit OR1 and an output signal SS1c from the comparator 12 are supplied to the AND circuit AD2 and the AND circuit AD2 outputs the signal SS1. The other elements illustrated in FIG. 12 may be substantially the same or similar to the other elements of the power supply apparatus 20b of the second embodiment.

Figure 11:
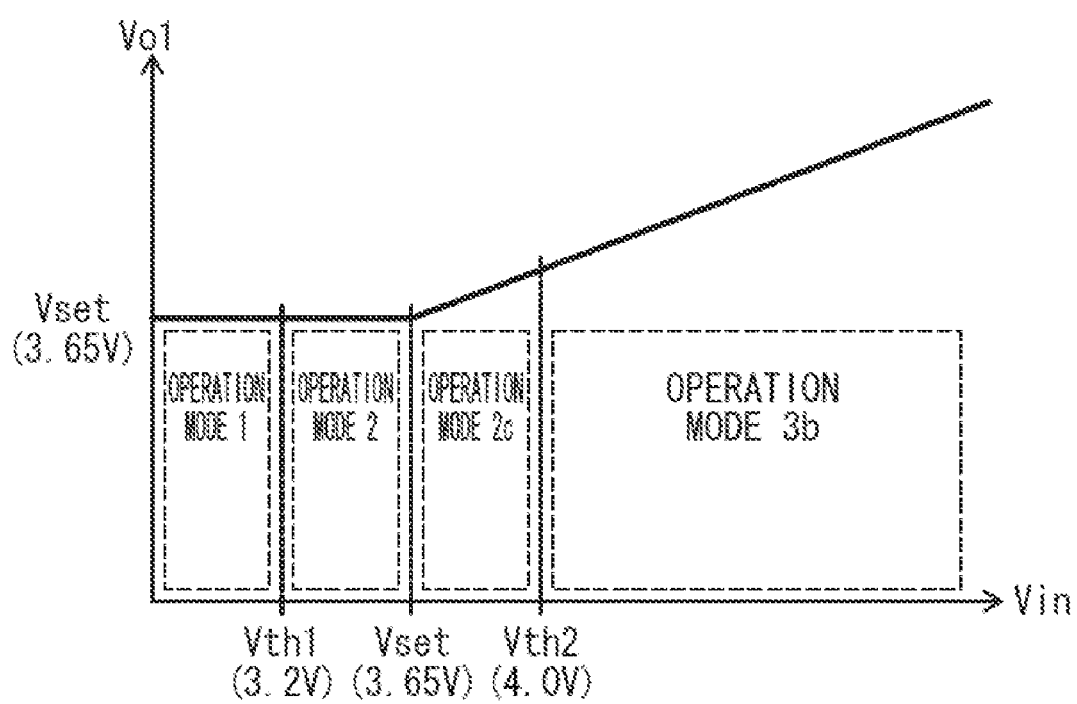
FIG. 11 illustrates an exemplary operation of a power supply apparatus.

FIG. 11 illustrates an exemplary operation of a power supply apparatus. The power supply apparatus 20c illustrated in FIG. 10 may perform the operation illustrated in FIG. 11. Where the relationship, input voltage Vin<threshold voltage Vth1, holds, the DC-DC converter 4c performs a PWM operation at a given frequency. Operation under this condition may be defined as the operation mode 1. Where input voltage Vin≧threshold voltage Vth2, the DC-DC converter 4c stops and the transistor Q1 turns on. Operation under this condition may be defined as the operation mode 3b.

Where the relationship, input voltage Vin≧threshold voltage Vth1 and output voltage Vo1≦set output voltage Vset, holds, the DC-DC converter 4c performs a PWM operation at a frequency lowered according to the input voltage Vin. Operation under this condition may be defined as operation mode 2. Where input voltage Vin≦threshold voltage Vth2 and output voltage Vo1>set output voltage Vset, the DC-DC converter 4c performs a PWM operation, for example, a standby mode of operation, at a frequency lowered according to the input voltage Vin. Alternatively, the DC-DC converter 4c stops and the transistor Q1 turns on. Operation under this condition may be defined as operation mode 2c. In the operation mode 2c, the standby mode of operation is selected according to the result of comparison made by the comparator circuit 2, the comparator circuit 63, or the comparator circuit 64.

Figure 12:
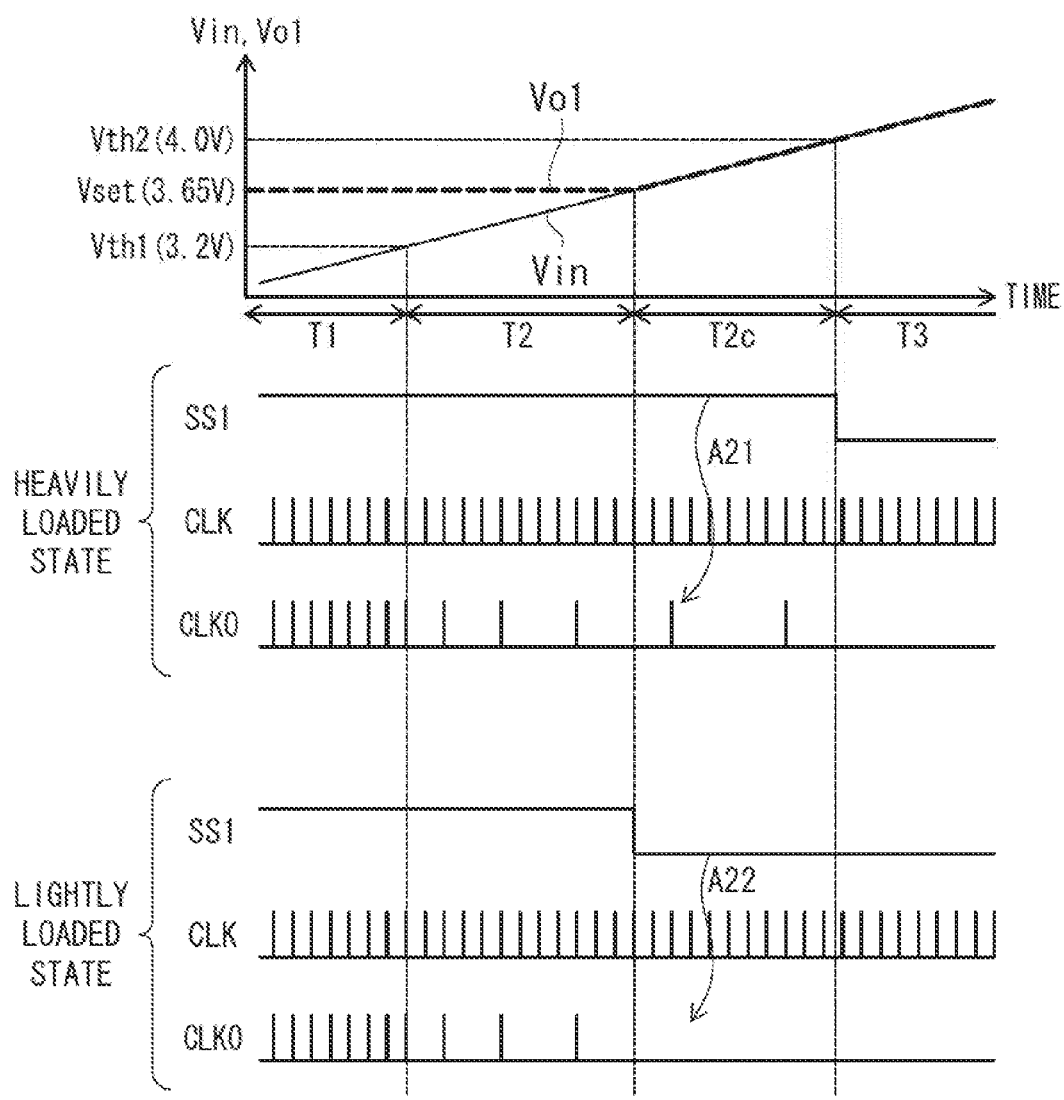
FIG. 12 illustrates an exemplary operation of a power supply apparatus.

FIG. 12 illustrates an exemplary operation of a power supply apparatus. The power supply apparatus 20c illustrated in FIG. 10 may perform the operation illustrated in FIG. 12. During the period T1 in which input voltage Vin<threshold voltage Vth1, for example, 3.2 V, the DC-DC converter 4c operates, for example, in the operation mode 1. The operating frequency of the transistors Q1 to Q3 may be 1.25 MHz, for example.

During the period T2 in which the relationship, threshold voltage Vth1, for example, 3.2 V≦input voltage Vin set output voltage Vset, for example, 3.65 V, holds, the DC-DC converter 4c operates, for example, in the operation mode 2. The operating frequency of the transistors Q1 to Q3 may be variable according to the input voltage Vin.

During a period T2c in which the relationship, input voltage Vin≦threshold voltage Vth2, for example, 4.0 V and output voltage Vo1>set output voltage Vset, for example, 3.65 V, holds, the DC-DC converter 4c operates, for example, in the operation mode 2c. In the operation mode 2c, the comparator 12 of the comparator circuit 2 outputs the high-level signal SS1c. The comparator circuit 63 outputs the low-level signal SS3.

For example, the load current Iout may be greater than the threshold current Ith determined by the reference voltage Vref4. Therefore, the power supply apparatus 20c may be heavily loaded. Because the load current Iout is greater than the threshold current Ith, the comparator circuit 64 outputs a high-level signal SS4. The signal SS5 output from the OR circuit OR1 becomes high. Because the signal SS1 is at high level, the VCO 1 outputs the control clock signal CLKO whose frequency has been lowered (arrow A21). The transistor Q1-Q3 perform switching operations. The DC-DC converter 4c is placed in the standby mode. The other controls may be substantially the same or similar to the controls illustrated in the third embodiment.

For example, the load current Iout is smaller than the threshold current Ith determined by the reference voltage Vref4 and so the power supply apparatus 20c may be lightly loaded. Because the load current Iout is smaller than the threshold current Ith, the comparator circuit 64 outputs the low-level signal SS4. The output signal SS5 from the OR circuit OR1 becomes low level. Because the signal SS1 is at a low level, the control clock signal CLKO output from the VCO 1 ceases (arrow A22). Switching operations of the transistors Q2 and Q3 stop. The DC-DC converter 4c is placed out of the standby mode. The transistor Q1 turns on and the current supply path CP2 is formed.

During the period T3 in which the relationship given by input voltage Vin threshold voltage Vth2, for example, 4.0 V holds, the DC-DC converter 4c operates, for example, in the operation mode 3b. The comparator 12 of the comparator circuit 2 outputs the low-level signal SS1c and, therefore, the signal SS1 output from the AND circuit AD2 becomes low level. In response to the low-level signal SS1, the transistors Q2 and Q3 turn off. The PMOS transistor Q1 turns on.

Figure 13:
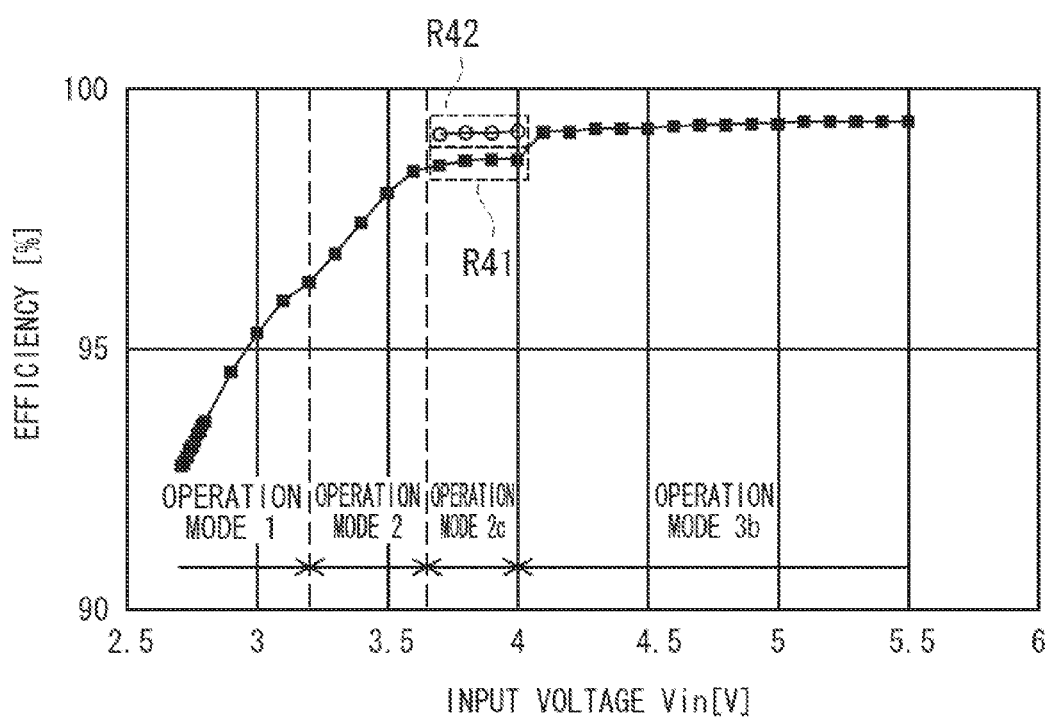
FIG. 13 illustrates an exemplary efficiency of a DC-DC converter.

FIG. 13 illustrates an exemplary efficiency of a DC-DC converter. The DC-DC converter illustrated in FIG. 13 may be the DC-DC converter 4C illustrated in FIG. 10. In FIG. 13, the line efficiency of the DC-DC converter 4c relative to the input voltage Vin is illustrated. In the operation mode 2c, the efficiency (region R42) obtained when the converter is not in the standby mode is higher than the efficiency (region R41) obtained when the DC-DC converter 4c is in the standby mode because the switching loss of the converter 4c is reduced when the standby mode of operation ceases.

In the power supply apparatus 20 of the first embodiment, the DC-DC converter 4 is in the standby mode under the condition where set output voltage Vset<input voltage Vin<threshold voltage Vth2 in the operation mode 2. Therefore, when the input voltage Vin drops rapidly, the response speed is enhanced. Switching loss may occur due to the standby mode.

In the DC-DC converter 4c of the third embodiment, the comparator circuits 2 and the comparator circuit 63 decide whether or not the operation mode is the operation mode 2c. If the operation mode is the operation mode 2c, the comparator circuit 64 detects the magnitude of the load. Whether the converter enters the standby mode or not is decided according to the magnitude of the load.

Where the comparator circuit 64 detects that the load current is greater than the threshold current Ith, the converter is judged to be a heavily loaded condition and enters the standby mode. Under the heavily loaded condition, the load current is large. Therefore, when the input voltage Vin decreases rapidly, for example, as illustrated in FIG. 6, the output voltage Vo1 decreases greatly after the instant t2 at which the input voltage Vin is below the set output voltage Vset. At the instant t1 at which the output voltage Vo1 becomes the threshold voltage Vth2 or less, the standby mode is initiated. Therefore, any overshoot as illustrated in the region R1 does not occur.

Where the comparator circuit 64 detects that the load current is smaller than the threshold current Ith, the converter is judged to be lightly loaded and the standby mode is discontinued. Then, if the input voltage Vin decreases rapidly, the switching control circuit 3 is activated at the instant t2 (FIG. 6) and so a step-up operation is started after a lapse of a response delay time from the instant t2. Under a lightly loaded condition, the load current is small. Therefore, the output voltage Vo1 decreases slightly during the response delay time. An overshoot occurring during the response delay time may be tolerated. When the standby mode of operation ceases, switching loss of the DC-DC converter 4c decreases, resulting in higher efficiency.

The threshold current Ith may be set so that the amount by which the output voltage Vo1 produced during the response delay time decreases is within a tolerable range. The threshold current Ith is determined based on the circuit of the DC-DC converter 4c. For example, as the capacitance of the output capacitor C1 increases, the output voltage Vo1 decreases by a smaller amount during the response delay time. The value of the threshold current Ith is increased by increasing the capacitance of the output capacitor C1.

When the standby mode is halted, the load current is supplied through the current supply paths CP1 and CP2. However, various elements including the coil 7 and transistor Q1 are present in the paths and so a voltage drop corresponding to the load current may take place. The output voltage Vo1 drops relative to the input voltage Vin by an amount corresponding to the voltage drop according to the magnitude of the load current. Therefore, the threshold current Ith may be set so that the output voltage Vo1 reduced by the voltage drop will not decrease below the set output voltage Vset.

In the third embodiment, the load current Iout is measured by monitoring the coil current flowing through the coil 7. The load current Iout may be measured by directly monitoring the current flowing into the output terminal Tout1.

In the third embodiment, by detecting whether the output voltage Vo1 is greater than the set output voltage Vset, whether the present mode is the operation mode 2c or not is decided. Whether the present mode is the operation mode 2c or not may be decided based on the input voltage Vin. For example, whether a voltage value, which is lower than the input voltage Vin by an amount corresponding to the voltage drop across the current supply path CP1 or CP2, is greater than the set output voltage Vset or not may be detected.

Figure 14:
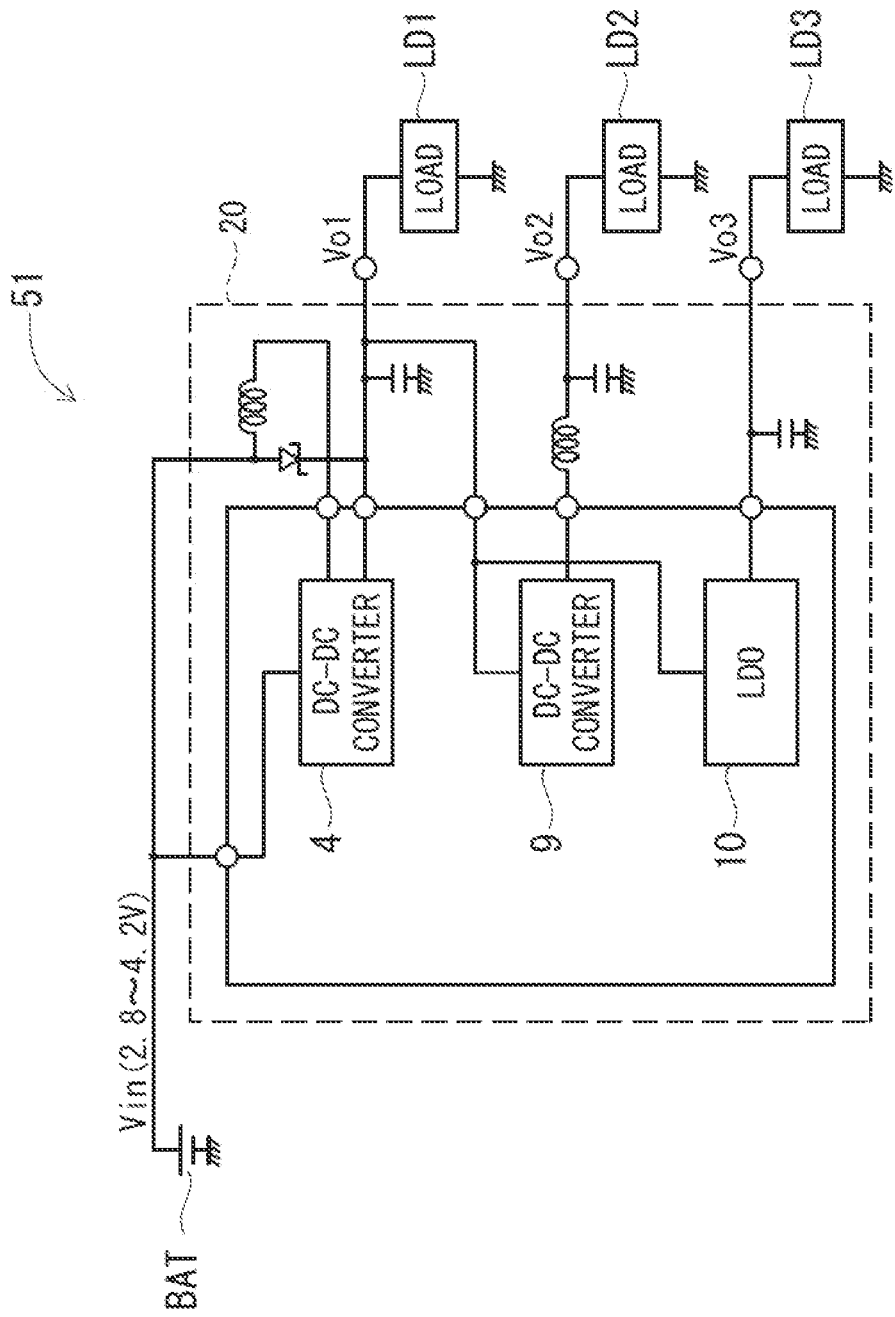
FIG. 14 illustrates an exemplary electronic device.

FIG. 14 illustrates an exemplary electronic device. The electronic device illustrated in FIG. 14 may include the power supply apparatus 20 of the embodiments. The electronic device 51 includes a battery BAT, the power supply apparatus 20, and loads LD1 to LD3. The input voltage Vin is supplied to the power supply apparatus 20. The power supply apparatus 20 may supply an output voltage Vo1, for example, of 3.65 V or higher to the load LD1. Because the output voltage Vo1 varies, for example, within a range equal to or higher than 3.65 V, the load LD1 preferably includes a load such as an LED that is relatively unaffected by variations in the power-supply voltage. The power supply apparatus 20 may supply the output voltages Vo1 and Vo3, for example, of 3.3 V to the loads LD2 and LD3, respectively.

The control circuits 11 and 11b may be included in a semiconductor chip. The power supply apparatus 20 and 20b of the embodiments may be included in the semiconductor chip. The DC-DC converters 4, 9, and LOD regulator 10 of the embodiments may be included in a module.

The frequency of the control clock signal CLKO is varied linearly according to the value of the input voltage Vin. The frequency of the control clock signal CLKO may be varied in steps.

The voltage-controlled oscillator circuit 41 varies the frequency of the clock signal according to the value of the input voltage Vin. Other circuits performing this function may be employed in the embodiments.

In the embodiments, the DC-DC converters 4 and 4b are current mode converters. The DC-DC converters 4 and 4b vary the operating frequency according to the value of the input voltage Vin. Therefore, the embodiments are applicable also to voltage mode DC-DC converters.

The power supply apparatus 20 of the embodiments includes the DC-DC converter 9 and LDO regulator 10. The power supply apparatus 20 may include one of the DC-DC converter 9 and LDO regulator 10.

The transistors Q2, Q1, threshold voltages Vth1, Vth2, comparator 43, comparator circuit 2, clock signal generating circuit 44, oscillator 14, control clock signal CLKO, switching control circuit 3, DC-DC converter 4, signal SS2, set output voltage Vset, comparator circuits 63, 64, threshold current Ith, and output capacitor C1 may be replaced by other circuit components or other threshold values.

Example embodiments of the present invention have now been described in accordance with the above advantages. It will be appreciated that these examples are merely illustrative of the invention. Many variations and modifications will be apparent to those skilled in the art.

The invention claimed is:

1. A power supply apparatus comprising:
a first switch provided between an inductor and a terminal to which a reference voltage is applied;
a second switch provided between the inductor and an output terminal;
a first comparator circuit that compares an input voltage with a first comparison voltage;
a signal generating circuit that outputs a frequency signal according to an output from the first comparator circuit; and
a first control circuit that controls the first and second switches based on an output from the signal generating circuit to control an electrical current flowing into the inductor.

2. The power supply apparatus according to claim 1, further comprising:
a second comparator circuit that compares the input voltage with a second comparison voltage,
wherein the signal generating circuit stops outputting the frequency signal based on an output from the second comparator circuit, and
wherein a current path through which electrical current according to the input voltage is supplied to the output terminal is formed when the signal generating circuit stops.

3. The power supply apparatus according to claim 2, wherein the first comparator circuit outputs a control signal for lowering the frequency of the frequency signal to the signal generating circuit when the input voltage is equal to or higher than the first comparison voltage.

4. The power supply apparatus according to claim 3, wherein the signal generating circuit lowers the frequency of the frequency signal when the input voltage is greater than the first comparison voltage.

5. The power supply apparatus according to claim 2, further comprising:
a third comparator circuit that compares an output voltage with a set output voltage indicating a target value of the output voltage: and
a fourth comparator circuit that compares a load current with a first comparison current,
wherein the signal generating circuit outputs the frequency signal according to an output from the second comparator circuit or an output from the fourth comparator circuit.

6. The power supply apparatus according to claim 5,
wherein the signal generating circuit stops outputting the frequency signal when the second comparator circuit detects that the input voltage is smaller than the second comparison voltage, the third comparator circuit detects that the output voltage is greater than the set output voltage, and the fourth comparator circuit detects that the load current is smaller than the first comparison current.

7. The power supply apparatus according to claim 5, further comprising:
an output capacitor provided in an output path for the output voltage,
wherein the first comparison current is set based on a capacitance of the output capacitor.

8. The power supply apparatus according to claim 1, wherein the first comparison voltage is set to a value equal to or less than a value obtained by subtracting a differential voltage between the set output voltage and the input voltage of the power supply apparatus from the set output voltage.

9. The power supply apparatus according to claim 2, wherein the second comparison voltage is set to a value that is equal to or higher than a value obtained by adding a voltage drop produced across the current path to the set output voltage of the power supply apparatus.

10. The power supply apparatus according to claim 1, further comprising:
a first control loop that monitors the output voltage and controls the first and second switches; and
a second control loop that monitors the input voltage and controls the first and second switches.

11. The power supply apparatus according to in claim 2, further comprising:
a third comparator circuit that compares the output voltage with a set output voltage indicating a target value of the output voltage; and
a fourth comparator circuit that compares a load current with a first comparison current,
wherein the signal generating circuit outputs the frequency signal in response to an output of the second comparator circuit or the fourth comparator circuit.

12. The power supply apparatus according to claim 11, wherein the signal generating circuit stops outputting the frequency signal when the second comparator circuit detects that the input voltage is smaller than the second comparison voltage, the third comparator circuit detects that the output voltage is greater than the set output voltage, and the fourth comparator circuit detects that the load current is smaller than the first comparison current.

13. The power supply apparatus according to claim 11, further comprising:
an output capacitor provided in an output path for the output voltage,
wherein the first comparison current is set based on a capacitance of the output capacitor.

* * * * *